(12) United States Patent
Kim et al.

(10) Patent No.: US 8,406,962 B2
(45) Date of Patent: Mar. 26, 2013

(54) METHOD FOR DETERMINING OPERATING STATE OF ELEMENT OF TRANSMISSION

(75) Inventors: Youngchul Kim, Gwangmyeong-si (KR); Sanghyun Jeong, Hwaseong-si (KR); Jangmi Lee, Tongyeong-si (KR); Sanglok Song, Hwaseong-si (KR); Yeonho Kim, Suwon-si (KR); Jaeshin Yi, Suwon-si (KR); Haksung Lee, Gunpo-si (KR); Seungki Kong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 19 days.

(21) Appl. No.: 13/167,317

(22) Filed: Jun. 23, 2011

(65) Prior Publication Data

US 2012/0116622 A1 May 10, 2012

(30) Foreign Application Priority Data

Nov. 9, 2010 (KR) .................. 10-2010-0110969

(51) Int. Cl.
*B60R 22/00* (2006.01)

(52) U.S. Cl. ............... 701/49; 701/99; 701/54; 701/53; 701/51; 701/61; 477/120; 477/110

(58) Field of Classification Search .............. 701/22, 701/55, 58, 61, 41, 99, 54, 53, 51; 477/3, 477/5, 110, 120, 70, 97; 475/5, 284; 180/65.22, 180/65.225, 65.23, 65.235, 65.25, 65.265
See application file for complete search history.

(56) References Cited

U.S. PATENT DOCUMENTS

| | | | |
|---|---|---|---|
| 7,252,612 B2* | 8/2007 | Bucknor et al. ............ | 475/5 |
| 7,682,275 B2 | 3/2010 | Yoneyama | |
| 7,998,016 B2* | 8/2011 | Si et al. .................. | 475/284 |
| 2007/0049443 A1* | 3/2007 | Schmidt .................... | 475/5 |
| 2007/0275808 A1* | 11/2007 | Iwanaka et al. ............ | 475/5 |
| 2009/0312129 A1* | 12/2009 | Park et al. .................. | 475/5 |
| 2010/0081533 A1* | 4/2010 | Lee et al. .................. | 475/5 |
| 2012/0010794 A1* | 1/2012 | Sahashi et al. ............ | 701/58 |

FOREIGN PATENT DOCUMENTS

| | | |
|---|---|---|
| JP | 2006-77859 A | 3/2006 |
| JP | 2008-2553 A | 1/2008 |
| KR | 2002-0011880 A | 2/2002 |
| KR | 10-2009-0022150 A | 3/2009 |

* cited by examiner

*Primary Examiner* — Tan C. To
*Assistant Examiner* — Jelani Smith
(74) *Attorney, Agent, or Firm* — Morgan, Lewis & Bockius LLP

(57) ABSTRACT

A method for determining an operating state of elements of a transmission may include acquiring rotational speeds of both members constituting the elements, determining whether the rotational speeds of the members may be the same, and determining that the elements may be directly connected when the rotational speeds of the members may be the same, and that the elements may be disconnected or slip when the rotational speeds of the members may be different.

8 Claims, 6 Drawing Sheets

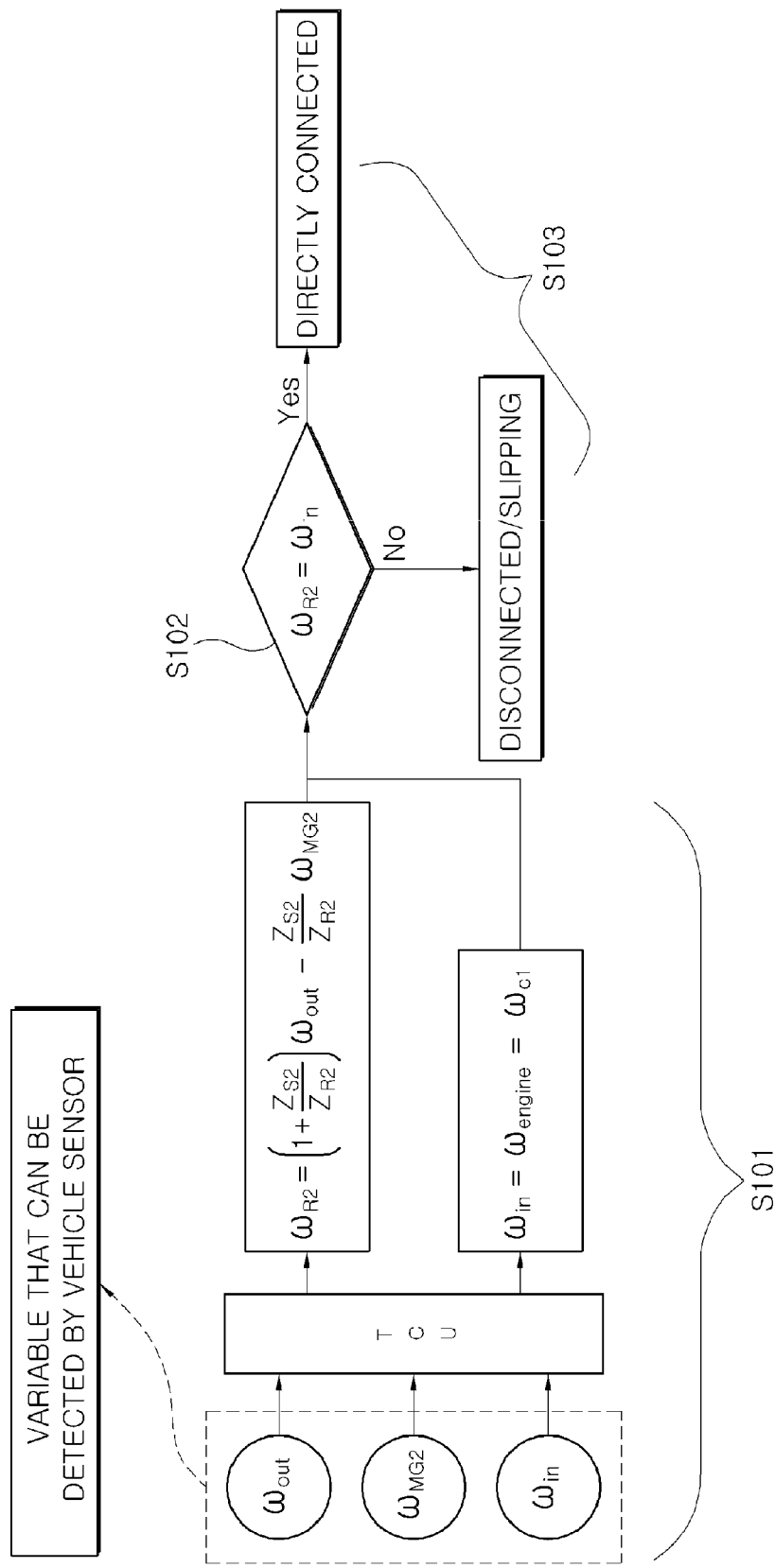

METHOD FOR DETERMINING OPERATING STATE OF ELEMENT OF TRANSMISSION

CROSS-REFERENCE TO RELATED APPLICATIONS

The present application claims priority to Korean Patent Application Number 10-2010-0110969 filed Nov. 9, 2010, the entire contents of which application is incorporated herein for all purposes by this reference.

BACKGROUND OF THE INVENTION

1. Field of the Invention

The present invention relates to a method for determining an operating state of elements of a transmission, and more particularly, to a technology of determining connection and disconnection of elements, such as a clutch and a brake, of a transmission in a hybrid vehicle which can implement continuous shifting.

2. Description of Related Art

In the related art, connection and disconnection of elements in automatic transmissions are determined on the basis of a signal detected by a pressure switch.

That is, the pressure switch is disposed in a channel of a valve body which is connected to a corresponding clutch or a brake, such that when pressure above a predetermined level is applied to the pressure switch, it is determined that the element is connected in the channel, or if not, it is determined that the element is disconnected.

However, the method of using the pressure switch, as described above, requires a number of parts and increases the volume and weight of the valve body and the cost, such that it is preferable to be able to determine the operating state of the elements even without using the pressure switch described above.

In the methods of determining the operating state of elements, without depending on the signal from the pressure switch, there is a method of determining connection and disconnection of the elements by comparing the input speed and the output speed of an automatic transmission, but it can be used only for a constant transmission gear ratio, such as an automatic transmission.

A transmission that can implement a fixed stage mode with a constant transmission gear ratio and a power split mode is used for hybrid vehicles, in which although it is possible to determining the operating states of the elements by comparing input/output speeds of the transmission in the fixed stage mode with a constant transmission gear ratio, continuous shifting is implemented by two motors in the power split mode, such that it is impossible to determine the operating states of the element only by simply comparing the input/output speeds of the transmission, because the transmission gear ratio is not constant.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for determining the operating states of elements of a transmission in order to determine direct connection and disconnection of the elements without a specific pressure switch in a power split mode, in a transmission having the power split mode where continuous shifting is possible.

In an aspect of the present invention, the method for determining an operating state of elements of a transmission, may include acquiring rotational speeds of both members constituting the elements, determining whether the rotational speeds of the members may be the same, and determining that the elements may be directly connected when the rotational speeds of the members may be the same, and that the elements may be disconnected or slip when the rotational speeds of the members may be different.

The transmission to which the method may be applied may include a first planetary gear set including a first sun gear, a first ring gear, and a first carrier, wherein the first carrier forms a first element, a second planetary gear set including a second sun gear, a second ring gear, and a second carrier in which the second sun gear may be directly connected to the first sun gear, wherein the second ring gear forms a second element, a first brake restricting a rotation of the first ring gear, a second brake restricting a rotation of the second ring gear, wherein the second brake forms a third element, a first clutch connecting/disconnecting the first carrier and the first ring gear, and a second clutch connecting/disconnecting the first carrier and the second ring gear, wherein the first carrier may be directly connected to an engine, the first ring gear may be directly connected to a first motor generator, the second sun gear may be directly connected to a second motor generator, and the second carrier may be directly connected to an output member, and wherein whether in an input split mode performed by operation of the second brake, the second brake of the third element may be determined to operate when a rotational speed of the second ring gear of the second element may be 0, and the second brake of the third element may be determined to slip or be released when the rotational speed of the second ring gear may be not 0.

The rotational speed of the second ring gear may be determined by using a rotational speed of the second motor generator and a rotational speed of the output member.

The rotational speed ($\omega_{R2}$) of the second ring gear may be determined by $$\omega_{R2} = \left(1 + \frac{Z_{S2}}{Z_{R2}}\right)\omega_{out} - \frac{Z_{S2}}{Z_{R2}}\omega_{MG2}$$

where $\omega_{R2}$ may be the rotational speed of the second ring gear, $Z_{S2}$ may be a number of teeth of the second sun gear, $Z_{R2}$ may be a number of teeth of the second ring gear, $\omega_{out}$ may be the rotational speed of the output member, and $\omega_{MG2}$ may be the rotational speed of the second motor generator.

When the transmission may be in a composite split mode performed by operation of the second clutch, the first carrier and the second ring gear may be determined to be connected with each other when the rotational speed of the second ring gear may be the same as a rotational speed of the engine, and the second clutch may be determined to slip or be disengaged when the rotational speeds of the first carrier and the second ring gear may be not the same.

According to the exemplary embodiments of the present invention, it is possible to minimize the number of necessary parts and reduce the volume and weight of a hydraulic valve body and the cost of a transmission by determining direct connection and disconnection of elements without a specific pressure switch in a power split mode, in a transmission having the power split mode where continuous shifting is possible.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a diagram illustrating the operation of the present invention when the transmission shown in FIG. 2 is in the composite split mode.

Figure 1:
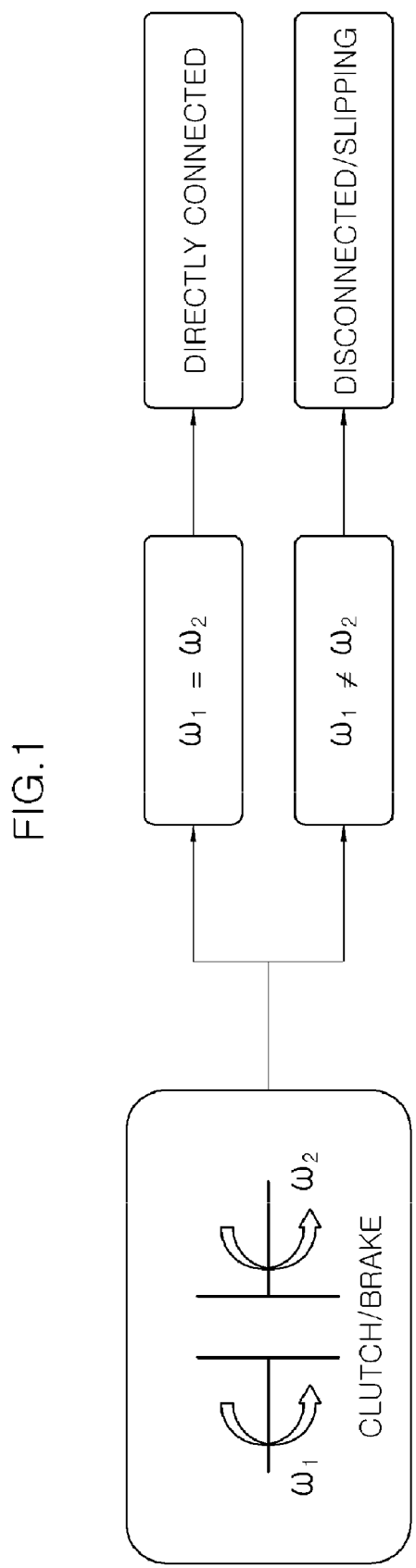
FIG. 1 is a diagram illustrating the operational principle of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 6, the method of determining the operating states of element of a transmission includes: acquiring rotational speed of both members constituting elements (S101), determining whether the rotational speeds of the members are the same (S102), and determining that the elements are directly connected when the rotational speeds of the members are the same, and that the elements are disconnected or slip when the rotational speeds are different (S103).

Referring to FIG. 1, comparing the rotational speeds of the members constituting a clutch or a brake, which are the elements, it is possible to determine that the two members are directly connected when the rotational speeds of the members are the same, or determine that the two members are disconnected or slip in contact with each other, when the rotational speeds are not the same.

Obviously, when the element is the brake, the rotational speed of one of the members is 0, such that when the rotational speed of the other member is 0, it can be determined that the brake is directly connected, or if not, it can be determined that the brake slips or is disconnected.

Figure 2:
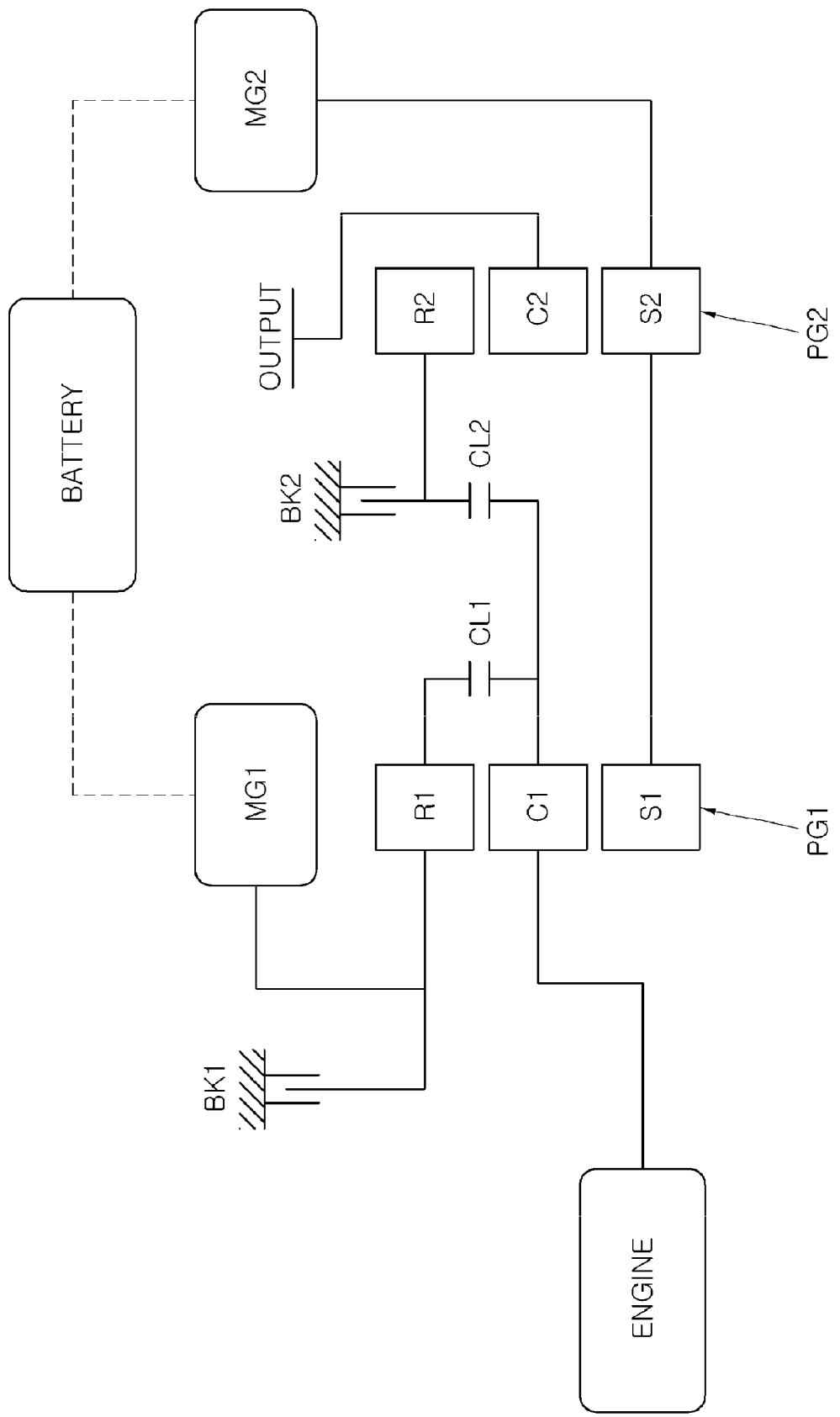
FIG. 2 is a diagram exemplifying the configuration of a hybrid transmission where the present invention is applied.

In the exemplary embodiment, a transmission where the method is applied, as shown in FIG. 2, includes: a first planetary gear set PG1 including a first sun gear S1, a first ring gear R1, and a first carrier C1, a second planetary gear set PG2 including a second sun gear S2, a second ring gear R2, and a second carrier C2 in which second sun gear S2 is directly connected to first sung gear S1, a first brake BK1 that restricts rotation of first ring gear R1, a second brake BK2 that restricts rotation of second ring gear R2, a first clutch CL1 that connects/disconnects first carrier C1 and first ring gear R1, and a second clutch CL2 that connects/disconnects first carrier C1 and second ring gear R2.

In this configuration, first carrier C1 is directly connected to an engine ENGINE, first ring gear R1 is directly connected to a first motor generator MG1, second sun gear S2 is directly connected to second motor generator MG2, and second carrier C2 is directly connected to an output member OUTPUT.

The transmission implements an input split mode by operating second brake BK2 and a method of determining whether second brake BK2 is operated, without a specific pressure switch, is as follows.

Figure 4:
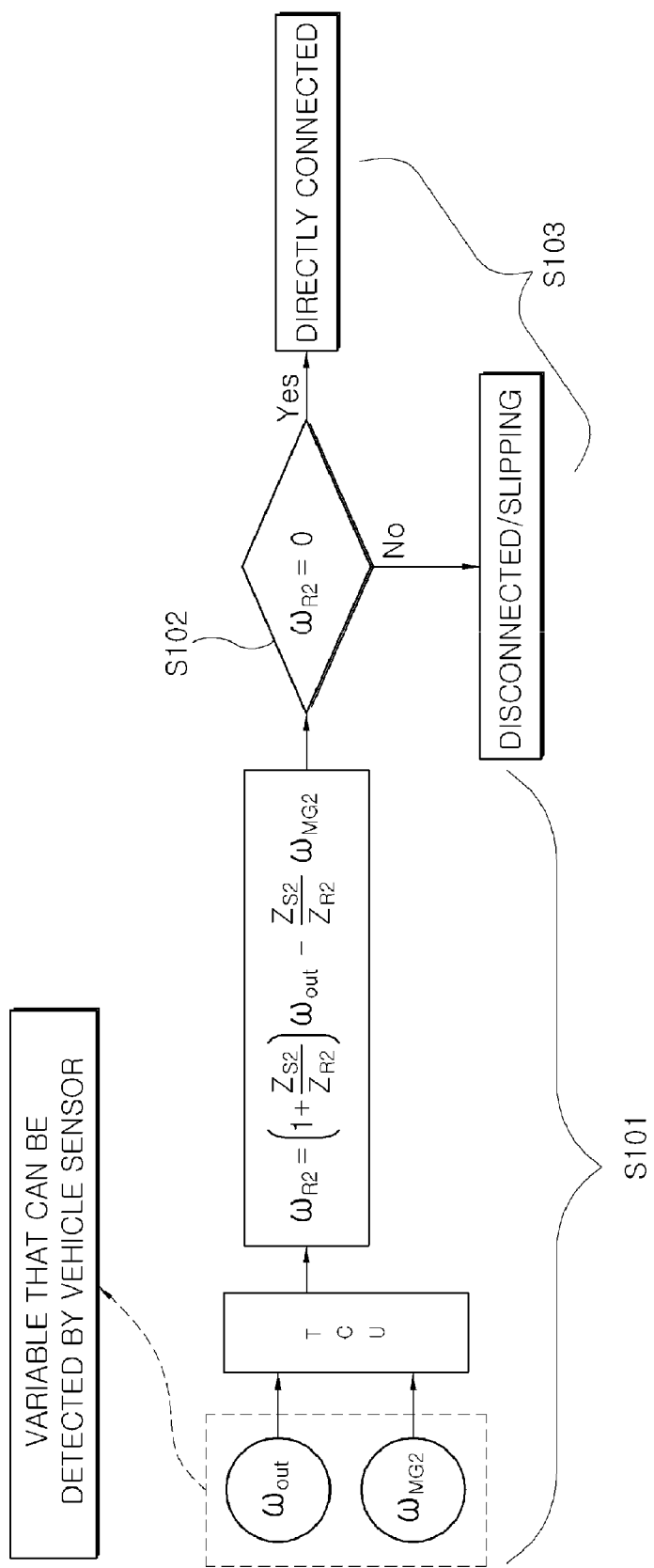
FIG. 4 is a diagram illustrating the operation of the present invention when the transmission shown in FIG. 2 is in the input split mode.
Figure 5:
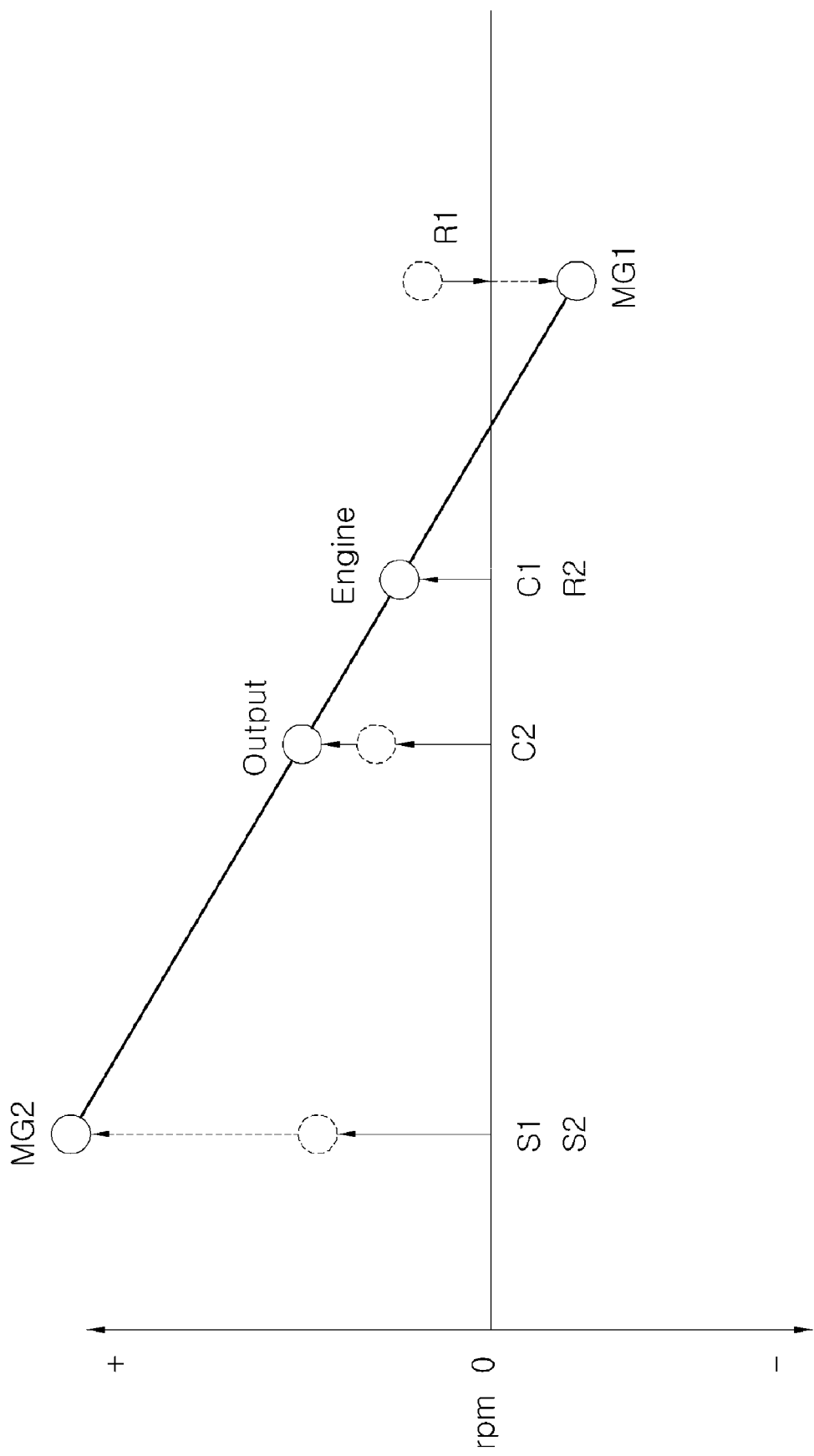
FIG. 5 is a lever analysis diagram when the transmission shown in FIG. 2 is in a composite split mode.

When the transmission is in the input split mode as shown in FIG. 4, the rotational speed of second ring gear R2 is calculated in the acquiring a speed (S101), it is determined whether the calculated rotational speed of second ring gear R2 is 0 in the determining sameness (S102), it is determined that second brake BK2 is operated when the rotational speed of second ring gear R2 is 0 and it is determined that second brake BK2 slips or is released when the rotational speed is not 0, in the determining operation (S103).

The rotational speed of second ring gear R2 is calculated by using the rotational speed of output member OUTPUT and the rotational speed of second motor generator MG2 in the acquiring a speed (S101), which is calculated by the following Formula 1, in detail.

$$\omega_{R2} = \left(1 + \frac{Z_{S2}}{Z_{R2}}\right)\omega_{out} - \frac{Z_{S2}}{Z_{R2}}\omega_{MG2} \qquad \text{[Formula 1]}$$

where $\omega_{R2}$ is the rotational speed of second ring gear R2, $Z_{S2}$ the number of teeth of second sun gear S2, $Z_{R2}$ is the number of teeth of second ring gear R2, $\omega_{out}$ is the rotational speed of output member OUTPUT, and $\omega_{MG2}$ is the rotational speed of second motor generator MG2.

Figure 3:
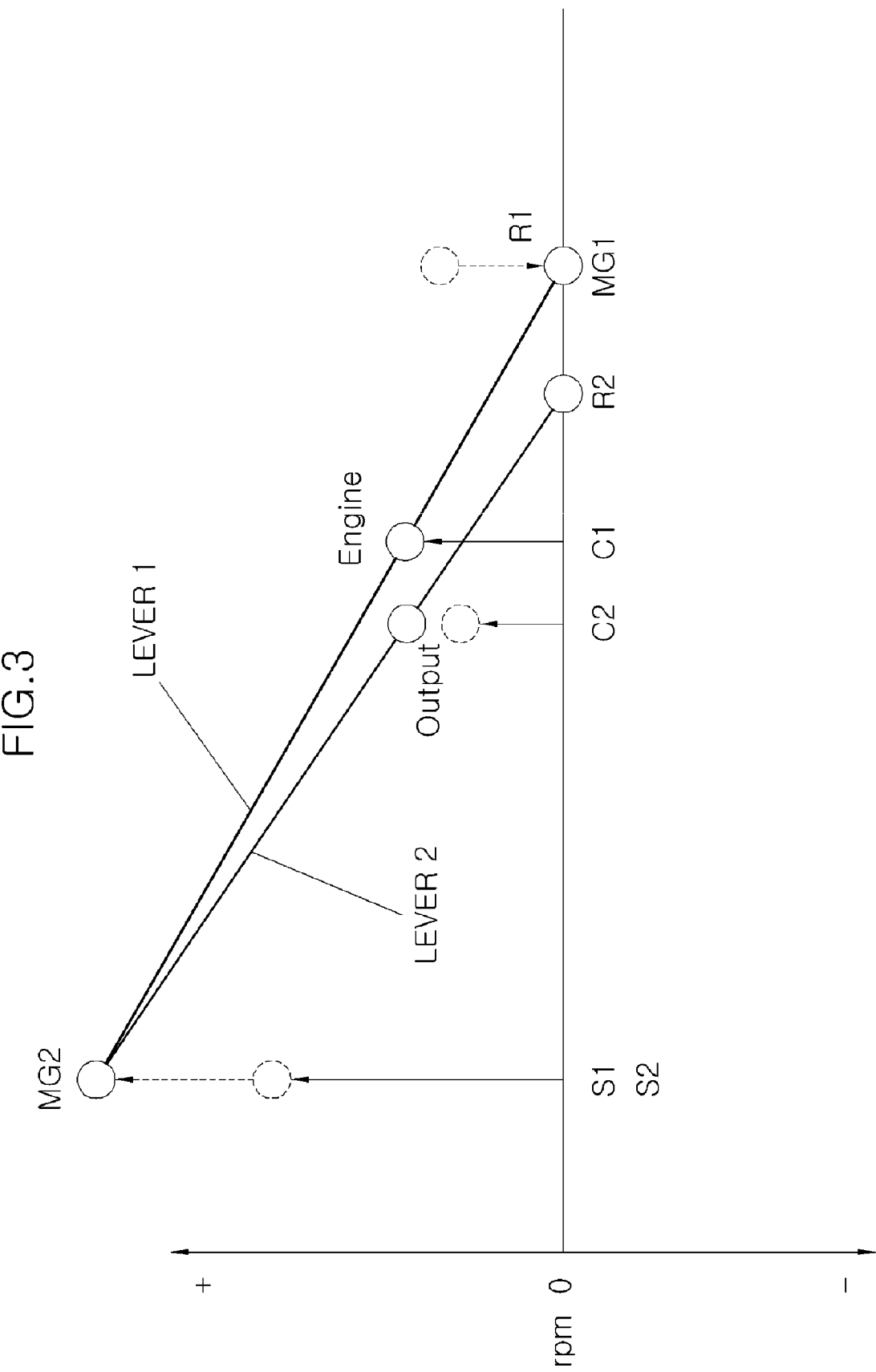
FIG. 3 is a lever analysis diagram when the transmission shown in FIG. 2 is in an input split mode.

This can be expressed by the level analysis diagram shown in FIG. 3 when the transmission shown in FIG. 2 is in the input split mode, and according to a method of calculating the speed of a planetary gear set at the lever 2 of FIG. 3, $$\omega_{R2} = \left(1 + \frac{Z_{S2}}{Z_{R2}}\right)\omega_{C2} - \frac{Z_{S2}}{Z_{R2}}\omega_{S2} \qquad \text{[Formula 2]}$$

where $\omega_{C2} = \omega_{out}$ and $\omega_{S2} = \omega_{MG2}$, such that it is the same as Formula 1. Obviously, $\omega_{C2}$ is the rotational speed of second carrier C2 and $\omega_{S2}$ is the rotational speed of second sun gear S2.

Meanwhile, when the transmission is a composite split mode as shown in FIG. 6, second clutch CL2 is connected, and a method of determining the operating state of second clutch CL2 is described hereafter.

The rotational speed of second ring gear R2 and the rotational speed of engine ENGINE are acquired in the acquiring a speed (S101), it is determined whether the calculated rotational speed of second ring gear R2 is the same as the rotational speed of engine ENGINE in the determining sameness (S102), and it is determined that second clutch CL2 that is the element is directly connected when the rotational speed of second ring gear R2 is the same as the rotational speed of engine ENGINE and it is determined that second clutch CL2 slips or is disconnected when the rotational speeds are not the same, in the determining operation (S103).

That is, second clutch CL2 that operates when the transmission is in the composite split mode has a structure in which one member is connected to second ring gear R2 and the other member is connected to engine ENGINE through first carrier C1, such that it is possible to ascertain the operating state of second clutch CL2 by comparing the rotational speed of second ring gear R2 with the rotational speed of engine ENGINE.

In this configuration, the rotational speed of second ring gear R2 is acquired by Formula 1 and the rotational speed of engine ENGINE is the rotational speed of the input shaft of the transmission, such that it is possible to determining the operating state of second clutch CL2 without using a specific pressure switch, using the method illustrated in FIG. 6.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for determining an operating state of elements of a transmission, the method comprising:
    acquiring rotational speeds of both members constituting the elements;
    determining whether the rotational speeds of the members are the same; and
    determining that the elements are directly connected when the rotational speeds of the members are the same, and that the elements are disconnected or slip when the rotational speeds of the members are different;
    wherein the transmission to which the method is applied includes:
    a first planetary gear set including a first sun gear, a first ring gear, and a first carrier;
    a second planetary gear set including a second sun gear, a second ring gear, and a second carrier in which the second sun gear is directly connected to the first sun gear;
    a first brake restricting a rotation of the first ring gear;
    a second brake restricting a rotation of the second ring gear;
    a first clutch connecting/disconnecting the first carrier and the first ring gear; and
    a second clutch connecting/disconnecting the first carrier and the second ring gear,
    wherein the first carrier is directly connected to an engine, the first ring gear is directly connected to a first motor generator, the second sun gear is directly connected to a second motor generator, and the second carrier is directly connected to an output member; and wherein:
    a rotational speed of the second ring gear is determined in the acquiring of the rotational speeds and whether the acquired rotational speed of the second ring gear is 0 is determined in the determining sameness, when the transmission is in an input split mode performed by operation of the second brake, and
    the determining operation determines that the second brake that is one of the elements is operated when the rotational speed of the second ring gear is 0, and that the second brake slips or is released when the rotational speed thereof is not 0.

2. The method as defined in claim 1, wherein the rotational speed of the second ring gear is determined by using a rotational speed of the second motor generator and a rotational speed of the output member in the acquiring of the rotational speeds.

3. The method as defined in claim 2, wherein the rotational speed ($\omega_{R2}$) of the second ring gear is determined by $$\omega_{R2} = \left(1 + \frac{Z_{S2}}{Z_{R2}}\right)\omega_{out} - \frac{Z_{S2}}{Z_{R2}}\omega_{MG2}$$

where $\omega_{R2}$ is the rotational speed of the second ring gear, $Z_{S2}$ is a number of teeth of the second sun gear, $Z_{R2}$ is a number of teeth of the second ring gear, $\omega_{out}$ is the rotational speed of the output member, and $\omega_{MG2}$ is the rotational speed of the second motor generator.

4. The method as defined in claim 3, wherein when the transmission is in a composite split mode performed by operation of the second clutch, the rotational speed of the second ring gear and a rotational speed of the engine are acquired in the acquiring of the rotational speeds, and wherein:
    whether the acquired rotational speed of the second ring gear is the same as the rotational speed of the engine is determined in the determining sameness, and
    the determining operation determines that the second clutch is engaged when the rotational speed of the second ring gear is the same as the rotational speed of the engine, and that the second clutch slips or is disengaged when the rotational speeds of the second ring gear and the engine are not the same.

5. The method as defined in claim 1, wherein the transmission to which the method is applied includes:
    a first planetary gear set including a first sun gear, a first ring gear, and a first carrier, wherein the first carrier forms a first element;
    a second planetary gear set including a second sun gear, a second ring gear, and a second carrier in which the second sun gear is directly connected to the first sun gear, wherein the second ring gear forms a second element;
    a first brake restricting a rotation of the first ring gear;
    a second brake restricting a rotation of the second ring gear, wherein the second brake forms a third element;
    a first clutch connecting/disconnecting the first carrier and the first ring gear; and a second clutch connecting/disconnecting the first carrier and the second ring gear,
wherein the first carrier is directly connected to an engine, the first ring gear is directly connected to a first motor generator, the second sun gear is directly connected to a second motor generator, and the second carrier is directly connected to an output member; and
wherein:
whether in an input split mode performed by operation of the second brake, the second brake of the third element is determined to operate when a rotational speed of the second ring gear of the second element is 0, and
the second brake of the third element is determined to slip or be released when the rotational speed of the second ring gear is not 0.

6. The method as defined in claim 5, wherein the rotational speed of the second ring gear is determined by using a rotational speed of the second motor generator and a rotational speed of the output member.

7. The method as defined in claim 6, wherein the rotational speed ($\omega_{R2}$) of the second ring gear is determined by $$\omega_{R2} = \left(1 + \frac{Z_{S2}}{Z_{R2}}\right)\omega_{out} - \frac{Z_{S2}}{Z_{R2}}\omega_{MG2}$$

where $\omega_{R2}$ is the rotational speed of the second ring gear, $Z_{S2}$ is a number of teeth of the second sun gear, $\omega_{R2}$ is a number of teeth of the second ring gear, $\omega_{out}$ is the rotational speed of the output member, and $\omega_{MG2}$ is the rotational speed of the second motor generator.

8. The method as defined in claim 7, wherein when the transmission is in a composite split mode performed by operation of the second clutch,
the first carrier and the second ring gear are determined to be connected with each other when the rotational speed of the second ring gear is the same as a rotational speed of the engine, and
the second clutch is determined to slip or be disengaged when the rotational speeds of the first carrier and the second ring gear are not the same.

* * * * *